Patented Oct. 9, 1934

1,976,167

UNITED STATES PATENT OFFICE 1,976,167

NITROGENOUS DERIVATIVES OF THE ANTHRAQUINONE SERIES AND PROCESS OF MAKING SAME

Paul Grossmann, Basel, Switzerland, assignor to the firm of Society of Chemical Industry in Basle, Basel, Switzerland No Drawing. Application November 19, 1932, Serial No. 643,525. In Switzerland December 22, 1931

7 Claims. (Cl. 260—59)

The present invention relates to the manufacture of new nitrogenous derivatives of the anthraquinone series. It comprises the process of making these new derivatives as well as the new derivatives themselves.

It has been shown in British Patent No. 15355 of 1908 and in U. S. Patent No. 1,843,313 that by condensing leuco-1.4.5.8-tetrahydroxyanthraquinone with ammonia or an aliphatic amine, there may be obtained leuco-1.4-dihydroxy-5.8-diaminoanthraquinone or the N-alkylated derivatives thereof, respectively, two hydroxyl groups having been exchanged for the amine residue.

According to the present invention a further hydroxyl group may be exchanged for the amino-residue, that is to say the leuco-1.4.5.8-tetrahydroxyanthraquinone can be converted into leuco-1-hydroxy-4.5.8-triaminoanthraquinone or its N-alkylated derivatives by heating an aqueous solution of the amines, such as monoethylamine, monomethylamine, monopropylamine, monohydroxyethylamine, etc., referred to in the preceding paragraph to a temperature above 100° C., preferably in the presence of a small proportion of a reducing agent. The condensation can be carried out also with 1.4.5.8-tetrahydroxyanthraquinone in presence of a correspondingly larger proportion of the reducing agent. It is a matter of course that also the leuco bodies of the 1.4-dihydroxy-5.8-diaminoanthraquinone or the alkyl derivatives thereof obtainable according to the above cited patents may be further condensed into the corresponding triamino-derivatives according to the present process. These leuco-bodies can be oxidized by known methods. The anthraquinone derivatives obtained are on the one hand valuable dyestuffs for acetyl cellulose and on the other hand can in part be converted by sulfonation into wool dyestuffs soluble in water. They correspond to the general formula

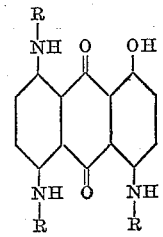

wherein R represents H or alkyl. If R stands for alkyl the products are new. These new products constitute in a dry state dark powders which dissolve in organic solvents, such as acetic ester or alcohol, to blue to blue-green solutions.

The following examples illustrate the invention, the parts being by weight:—

Example 1

27 parts of leuco-1.4.5.8-tetrahydroxyanthraquinone are heated in 250 parts of aqueous ammonia solution of 24 per cent. strength with 3 parts of sodium hydrosulfite for 5 hours in a closed vessel at 120° C.; leuco-1-hydroxy-4.5.8-triaminoanthraquinone is produced and may be oxidized in the usual manner.

The 1-hydroxy-4.5.8-triaminoanthraquinone of the formula

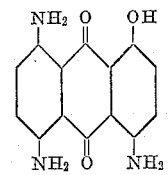

yields on acetate silk blue dyeings which are of a blue as pure and as powerful as the dyeings obtained with 1.4.5.8-tetraaminoanthraquinone, but exhibit, in contrast with the dyeings obtained with 1.4.5.8-tetraaminoanthraquinone an excellent fastness to light.

Example 2

13.5 parts of leuco-1.4.5.8-tetrahydroxyanthraquinone are heated in 135 parts of aqueous methylamine solution of 23 per cent. strength with 2.5 parts of sodium hydrosulphite for 5 hours at 120° C. whereby, very probably, leuco-1-hydroxy-4.5.8-trimethylaminoanthraquinone is produced; it is worked up in the usual manner. By oxidation there is very probably obtained the 1-hydroxy-4.5.8-trimethylaminoanthraquinone of the formula

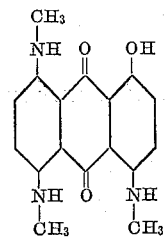

which dissolves in acetic ester to a blue-green solution.

Example 3

25 parts of leuco-1.4.5.8-tetrahydroxyanthraquinone are heated in 150 parts of water with 50 parts of β-hydroxyethylamine and 4 parts of sodium hydrosulfite for 5 hours at 120° C. whereby, very probably, leuco-1-hydroxy-4.5.8-tri-β-hydroxyethylaminoanthraquinone is produced; this is worked up in the usual manner. By oxidation there is very probably obtained the 1-hydroxy-4.5.8-tri-β-hydroxyethylaminoanthraquinone of the formula

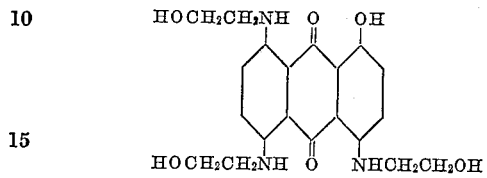

which dissolves in acetic ester to a blue-green solution.

*Example 4*

27 parts of pure leuco-1.4.5.8-tetrahydroxyanthraquinone are heated in 250 parts of aqueous ammonia solution of 24 per cent strength for 5 hours in a closed vessel at 120° C.; leuco-1-hydroxy-4.5.8-triaminoanthraquinone is produced which may be isolated and oxidized in the usual manner.

Some features of the products obtained according to the foregoing examples and oxidized to anthraquinone derivatives are exhibited in the following table:—

| Anthraquinone derivative | Solution in— | | |
|---|---|---|---|
| | Sulfuric acid | Sulfuric acid-boric acid | Sulfuric acid-formaldehyde |
| 1.4.5.8-tetraaminoanthraquinone | Colorless | Colorless | Violet. |
| Product according to the foregoing Example 1 | Yellow | Yellow-orange | Pure blue. |
| 1.4-diamino-5.8-dihydroxyanthraquinone | Red-brown | Violet | Green. |
| Product according to the foregoing Example 2 | Yellow-brown | Red | Pure blue. |
| 1.4-dimethylamino-5.8-dihydroxyanthraquinone | Red brown | Blue violet | Green. |
| Product according to the foregoing Example 3 | Yellow-brown | Olive | Pure blue. |
| 1.4-di-β-hydroxyethylamino-5.8-dihydroxyanthraquinone | Violet-red | Green-blue | Yellow-green. |

What I claim is:—

1. The manufacture of nitrogeneous derivatives of the anthraquinone series, consisting in heating leuco-1.4.5.8-tetrahydroxyanthraquinone at a temperature above 100° C. in an aqueous solution of bases of the group consisting of ammonia and primary aliphatic amines.

2. The manufacture of nitrogenous derivatives of the anthraquinone series, consisting in heating leuco-1.4.5.8-tetrahydroxyanthraquinone at a temperature above 100° C. in an aqueous solution of ammonia.

3. The manufacture of nitrogenous derivatives of the anthraquinone series, consisting in heating leuco-1.4.5.8-tetrahydroxyanthraquinone at a temperature above 100° C. in an aqueous solution of ammonia, in presence of a small proportion of a reducing agent.

4. The anthraquinone derivatives of the general formula

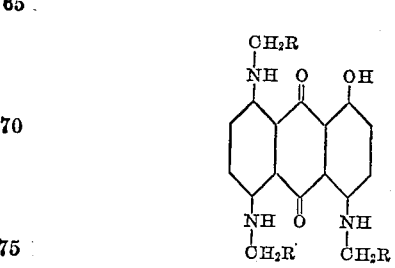

wherein R stands for a member of the group of monovalent radicals consisting of H, $CH_3$ and $CH_2OH$, which products constitute dark powders which dissolve in acetic ester to blue-green solutions.

5. The anthraquinone derivatives of the general formula

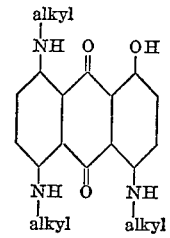

which products constitute dark powders which dissolve in acetic ester to blue-green solutions.

6. The anthraquinone derivative of the formula

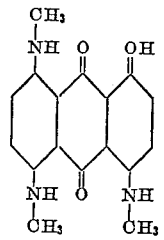

which product constitutes a dark powder which dissolves in acetic ester to a blue-green solution.

7. The anthraquinone derivative of the formula

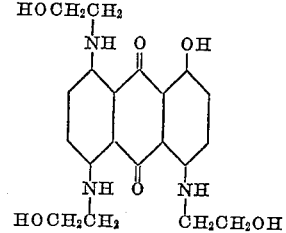

which product constitutes a dark powder which dissolves in acetic ester to a blue-green solution.

PAUL GROSSMANN.